Aug. 29, 1967 C. R. BISHOP 3,338,327
DRIVE ARRANGEMENT FOR VEHICLES WITH AN ARTICULATED FRAME
Filed March 7, 1966 2 Sheets-Sheet 1
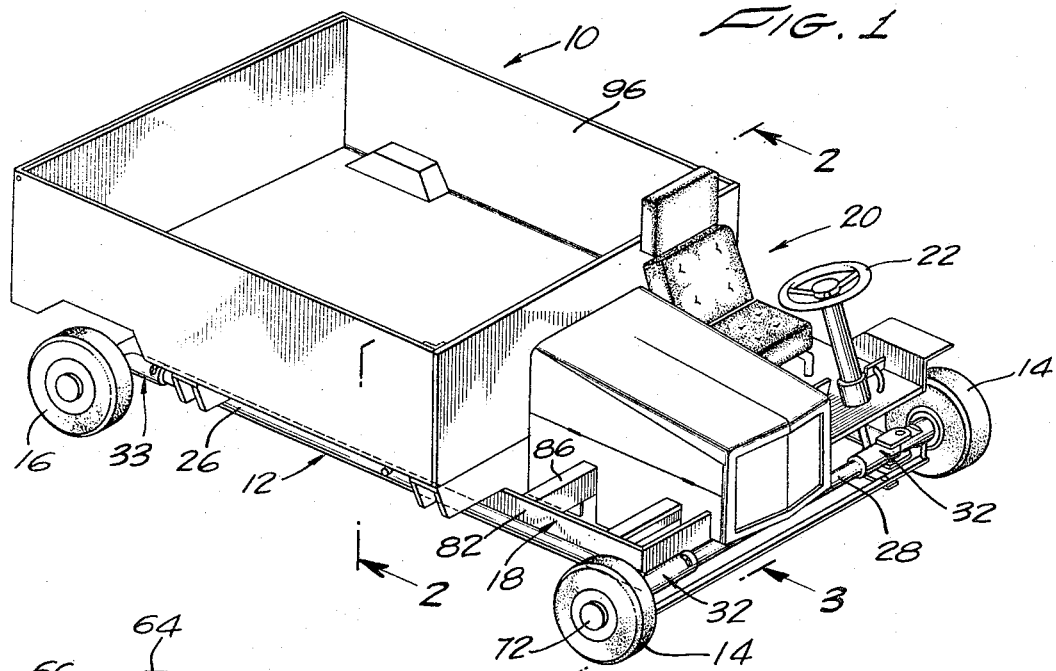
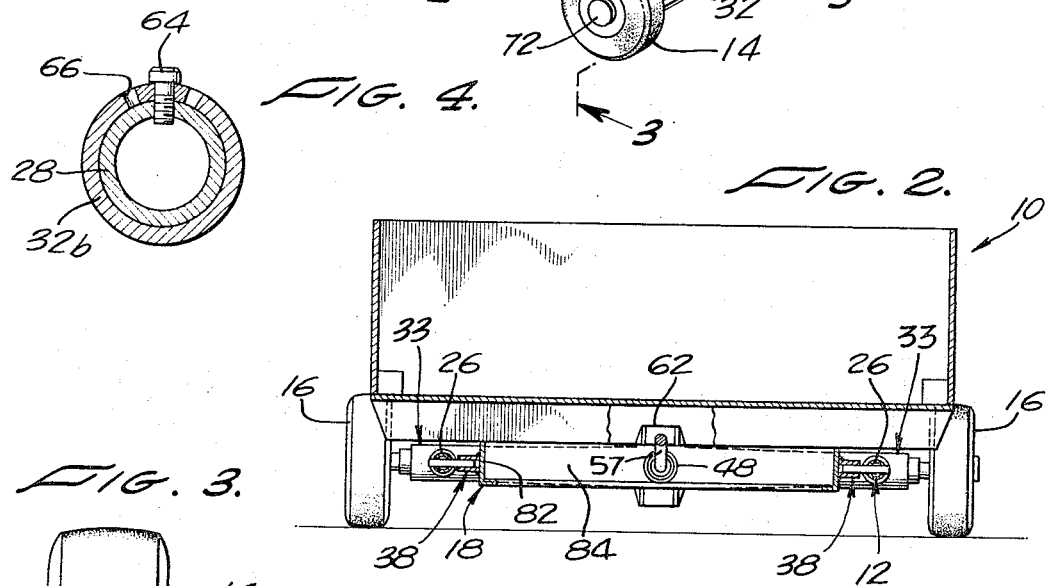
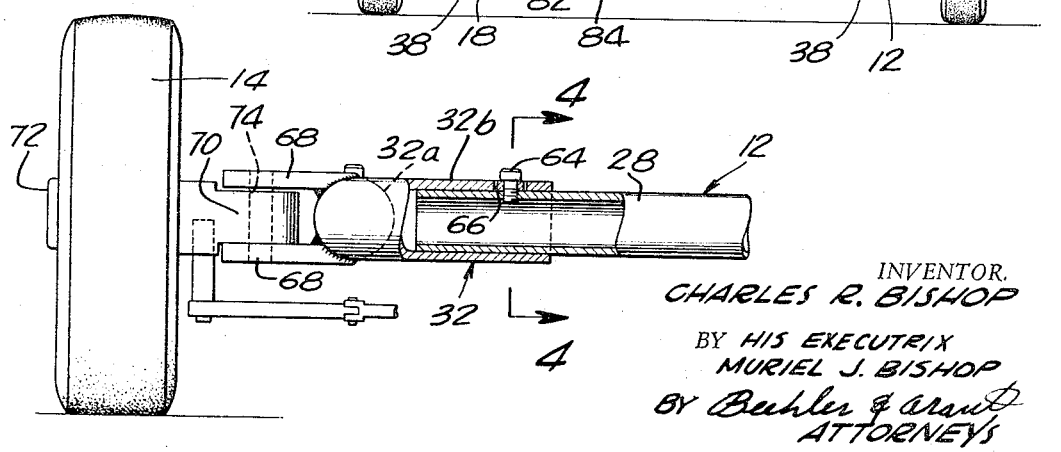
INVENTOR.
CHARLES R. BISHOP
BY HIS EXECUTRIX
MURIEL J. BISHOP
BY Buehler & Grant
ATTORNEYS Aug. 29, 1967  C. R. BISHOP  3,338,327
DRIVE ARRANGEMENT FOR VEHICLES WITH AN ARTICULATED FRAME
Filed March 7, 1966  2 Sheets-Sheet 2

INVENTOR.
CHARLES R. BISHOP
BY HIS EXECUTRIX
MURIEL J. BISHOP
BY Beehler & Arant
ATTORNEYS

United States Patent Office 3,338,327
Patented Aug. 29, 1967

3,338,327
DRIVE ARRANGEMENT FOR VEHICLES WITH AN ARTICULATED FRAME
Charles Richard Bishop, deceased, late of Garden Grove, Calif., by Muriel Janet Bishop, executrix, 10342 Hill Road, Garden Grove, Calif. 92640
Filed Mar. 7, 1966, Ser. No. 534,297
3 Claims. (Cl. 180—71)

ABSTRACT OF THE DISCLOSURE

A self-propelled vehicle including a generally rectangular rigid frame; an articulated flexible frame including four corner pieces, a pair of side members, and a pair of end members disposed around the periphery of the rigid frame; rotatable joints between the ends of each end member and each side member and the respectively associated corner pieces; pivotal couplings at the longitudinal centers of the side members attaching them to the rigid frame, so that the ends of the side members move up and down relative to the rigid frame but in opposite sense to each other; pivotal couplings at the longitudinal centers of the end members attaching them to the rigid frame so that the ends of the end members move up and down relative to the rigid frame but in opposite sense to each other; a motor carried on the rigid frame; a set of four wheels attached to the corner pieces of the flexible frame, one end pair of the wheels being powered; drive axles for the powered wheels disposed within the hollow interior of the associated end member of the flexible frame; a drive shaft connected to the motor and passing through one of the pivot joints into the one end member for the powered wheels; and differential gears inside the one end member for driving the axles from the drive shaft; so that torsional stresses from the articulated flexible frame are not transmitted to a load carried on the rigid frame, and the operation of the motor and drive shaft during the flexing of the flexible frame does not transmit torsional stresses either to the rigid frame or to the flexible frame.

This invention relates generally to self-propelled vehicles and, more particularly, to a novel drive arrangement for vehicles of the class disclosed in co-pending application Ser. No. 418,167, filed Dec. 14, 1964, now Patent No. 3,266,815 and entitled, Torsion Free Articulated Vehicle Suspension.

The aforementioned patent discloses vehicles having an articulated suspension which is effective to equalize the load on the vehicle wheels and to minimize or eliminate torsion stress in the vehicle chassis as well as in a pay load supported on the chassis, particularly during movement of the vehicles over uneven ground. Briefly, the vehicles disclosed in said patent comprise an articulated, generally rectangular frame having side members, end members, and corner members which are rotatably secured to the adjacent side and end members in such manner as to adapt the frame for articulation involving simultaneous pivoting of the side members in opposite directions about a transverse pivot axis of the frame and simultaneous pivoting of the end members in opposite directions about a longitudinal pivot axis of the frame. The vehicle chassis is pivotally connected on these pivot axes to the articulated frame. The frame, in turn, is supported on four ground engaging wheels located at the four corners of the frame. The arrangement of this vehicle suspension is such that each wheel is permitted to move vertically relative to the remaining wheels. Accordingly, during movement of the vehicle over uneven terrain, the four vehicle wheels move up and down effectively independently of one another in accordance with the contour of the terrain. Moreover, such independent vertical movement of the wheels occasions simple relative pivotal movement of the side and end members of the articulated frame and the vehicle chassis without imparting torsional or bending stresses to the chassis or to the pay load supported thereby. Another advantage of the articulated vehicle suspension resides in the fact that the points of pivotal attachment of the chassis to the articulated frame are located about midway between the vehicle wheels. Accordingly, the loading on the wheels is substantially equalized at all times. Also the vertical displacement of a given point of pivotal attachment occasioned by vertical displacement of an adjacent vehicle wheel is approximately one-half the wheel displacement. As a consequence, substantial rises and depressions encountered by the vehicle wheels produce only minor displacement of the vehicle chassis.

It is the general object of the present invention to provide a unique drive arrangement for vehicles of the character described.

A more specific object of the invention is to provide a drive arrangement for vehicles of the character described embodying a single propulsion motor mounted on the vehicle chassis and driveably coupled to a pair of drive wheels at one end of the vehicle thru a drive shaft which extends along the longitudinal pivot axis of the articulated suspension frame of the vehicle, whereby the drive connection between the propulsion motor and the drive wheels does not in any way inhibit articulation of the frame and such articulation is ineffective to produce bending stresses in the drive shaft.

Other objects, advantages, and features of the invention will become readily evident as the description proceeds.

With these and such other objects in view, the invention consists in the construction, arrangement, and combination of the parts of the invention, whereby the objects contemplated are obtained, as hereinafter set forth, pointed out in the appending claims, and illustrated in the accompanying drawings.

In these drawings:

FIGURE 1 is a perspective view of a self-propelled vehicle according to the invention;

FIGURE 2 is a section taken on line 2—2 of FIGURE 1;

FIGURE 3 is an enlarged view, partially broken away taken on line 3—3 in FIGURE 1;

FIGURE 4 is an enlarged section taken on line 4—4 in FIGURE 3;

Figure 5:
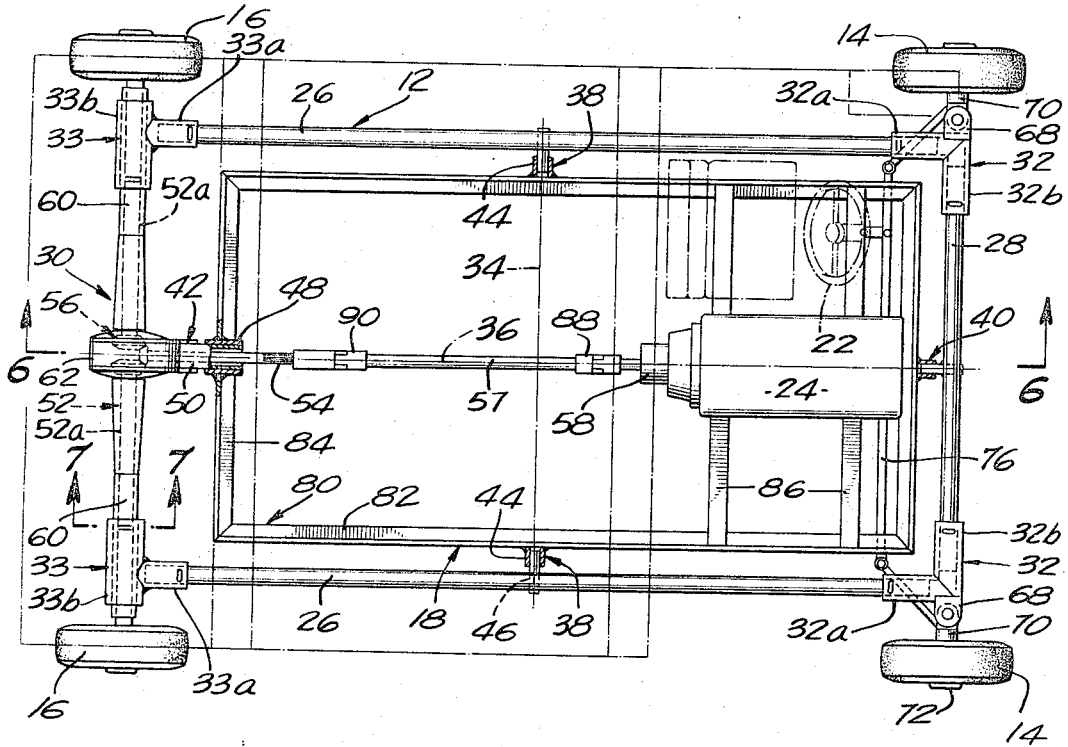
FIGURE 5 is a top plan view of the vehicle with portions of the vehicle chassis omitted for the sake of clarity.

The self-propelled vehicle 10 illustrated in these drawings comprises an articulated frame 12 supported on ground engaging wheels 14 and 16 and mounting a chassis 18. In the particular vehicle illustrated, wheels 14 are front wheels which are pivotally mounted on the front end of the frame 12 for steering movement. The wheels 16 are rear drive wheels which are mounted on the rear end of the frame 12. Located at the front end of the chassis 18 is a driver's compartment 20 having a steering wheel 22. This steering wheel is operatively connected to the front wheels 14 for steering the latter. Mounted on the front end of the chassis 18, at one side of the driver's compartment 20, is a propulsion motor 24 for driving the rear drive wheels 16. This propulsion motor is shown to be an internal combustion engine.

The main vehicle suspension, which includes the frame 12, wheels 14 and 16, and chassis 18, is essentially of the type disclosed in the aforementioned Patent No. 3,266,815. Accordingly, this suspension will be described only in sufficient detail to enable a full and complete understanding of the invention. The articulated suspension frame 12 comprises side members 26 having longitudinal axes extending lengthwise of the frame, end members 28 and 30 having longitudinal axes extending crosswise of the frame, and corner members 32, 33. Corner members 32, 33 are rotatably secured to their respective adjacent frame side and end members for rotation of the corner members relative to the adjacent side and end members on the longitudinal axes of these members. Frame 12 is thereby adapted for articulation involving simultaneous pivoting of the side members 26 in opposite directions about a transverse pivot axis 34 of the frame and simultaneous pivoting of the end members 28 and 30 in opposite directions about a longitudinal pivot axis 36 of the frame. Chassis 18 is pivotally attached to the frame 12 on the transverse and longitudinal pivot axes 34, 36 by means of four pivot means 38, 40, and 42. Pivot means 38 comprise bearing sleeves 44 which are rigidly secured to opposite sides of the chassis 18 on the transverse pivot axis 34 and journals 46 which are rigidly secured to the side members 26 of the frame 12 and rotatably engaged in the adjacent bearing sleeves. Pivot means 38, therefore, pivotally support the frame side members 26 on the chassis 18 for pivoting on the transverse pivot axis 34. The front pivot means 40 is identical in construction to the side pivot means 38 and pivotally supports the front frame member 28 on the chassis 18 for pivoting on the longitudinal pivot axis 36. The rear pivot means 42 comprises a bearing sleeve 48 which is rigidly secured to the rear end of the chassis 18 on the longitudinal pivot axis 36 and a journal 50 which is rigid on the rear frame member 30 and rotatably engages in the bearing sleeve 48. Pivot means 42, therefore, pivotally supports the rear frame member 30 on the chassis 18 for pivoting on the longitudinal pivot axis 36. The rear frame member 30 rotatably supports axle means 52 which are driveably coupled to the rear drive wheels 16. Extending axially through the rear pivot means 42 is a drive shaft 54, the rear end of which is driveably coupled, by gear means 56, to the axle means 52. The front end of the drive shaft 54 is driveably coupled to the motor 24 through a drive shaft extension 57 and a variable ratio, reversible transmission 58 on the motor.

It is evident at this point, therefore, that the rear drive wheels 16 are driven by the motor 24 for propelling the vehicle 10 along the ground. The vehicle speed is controlled by an accelerator pedal or the like (not shown) at the driver's compartment 20. Also located at this compartment is a shift lever (not shown) for controlling the ratio of and reversing the motor transmission 58, thus to permit the vehicle to travel both forwardly and in reverse. During movement of the vehicle over uneven terrain, the vehicle wheels 14, 16 rise and fall essentially independently of one another in accordance with the contour of the terrain encountered by each wheel. This essentially independent up and down movement of the wheels as the latter travel over uneven terrain causes simple relative pivotal movement of the side and end frame members 26, 28 and 30 and the vehicle chassis 18 on the transverse and longitudinal pivot axes 34, 36 in such manner that no torsional or bending stresses are created in the chassis or pay load. Moreover, since the points 38, 40, 42 of pivotal attachment of the chassis 18 to the frame 12 are located about midway between the adjacent vehicle wheels, the loading on the wheels is substantially equalized at all times. Also the vertical displacement of a given attachment point occasioned by vertical displacement of an adjacent wheel is only about one-half the wheel displacement. As a consequence, the chassis remains relatively level during movement of the vehicle over uneven ground.

Referring now in greater detail to the illustrated vehicle 10, the side members 26 and from end members 28 of the vehicle frame 12 comprise tubes which extend substantially the full length and width, respectively, of the vehicle. The rear end member 30 of the frame comprises an axle housing having co-axial cylindrical ends 60 and a central, generally cylindrical enlargement 62 defining a differential housing. Axle housing 30 extends substantially the full width of the vehicle. The rear tubular journal 50 is rigidly joined to and extends forwardly from the differential housing 62. The front corner members 32 are generally L-shaped and include rearwardly extending tubular arms 32a which rotatably receive the front ends of the frame side members or tubes 26 and inwardly extending tubular arms 32b which rotatably receive the adjacent ends of the front frame member or tube 28. As shown best in FIGURE 3, the corner members are rotatably secured to the adjacent frame tubes 26, 28 by means of pins or bolts 64 which are threaded in the frame tubes and extend through circumferentially elongated slots 66 in the corner members. The front corner members, therefore, are free to rotate relative to their respective adjacent frame tubes about the longitudinal axes of these tubes. Rigidly joined to each front corner member 32 and extending outwardly from the member in the longitudinal direction of the front frame tube 28 are a pair of hinge plates 68 which receive therebetween a tongue 70 on the adjacent front wheel axle 72. The axle tongues 70 are pivotally secured to their respective adjacent hinge plates 68 by means of hinge pins 74, whereby the front wheels 14 are pivotally connected to the front corner members 32 for steering movement relative to these members. The front wheels are interconnected by a link 76 which is operatively coupled to the steering wheel 22, in the usual way, to permit turning of the front wheels by rotation of the steering wheel. The rear corner members 33 are generally T-shaped and include forwardly extending tubular arms 33a which rotatably receive the rear ends of the side frame tubes 26 and laterally extending tubular arms 33b which rotatably receive the cylindrical ends 60 of the axle housing 30. The rear corner members 33 are rotatably secured to the frame side tubes 26 and the axle housing 30 by means of pins or bolts 76 which are threaded in the tubes and cylindrical housing ends 60 and extend through circumferentially elongated slots 78 in the corner members. The rear corner members, therefore, are rotatable relative to the frame side tubes 26 and the axle housing 30 on the longitudinal axes of these tubes and housing. The cylindrical ends 60 of the axle housing will be seen to extend completely through the rear corner members.

The rear axle means 52 comprise a pair of rear axles 52a which extend through and are rotatably supported in opposite ends of the axle housing 30. The outer ends of the axles 52a extend beyond the outer ends of the axle housing and are driveably coupled to the rear vehicle wheels 16. The inner ends of the axles 52a are driveably coupled to the adjacent end of the drive shaft 54 by the gear means 56. These gear means comprise conventional differential bevel gears which are located within the differential housing 62. The drive shaft 54 extends centrally through the differential housing journal 50 and into the differential housing 62 proper for driveable connection to the axles 52a. Contained within the journal 50 are bearings (not shown) for rotatably and axially supporting the drive shaft 54.

Figure 6:
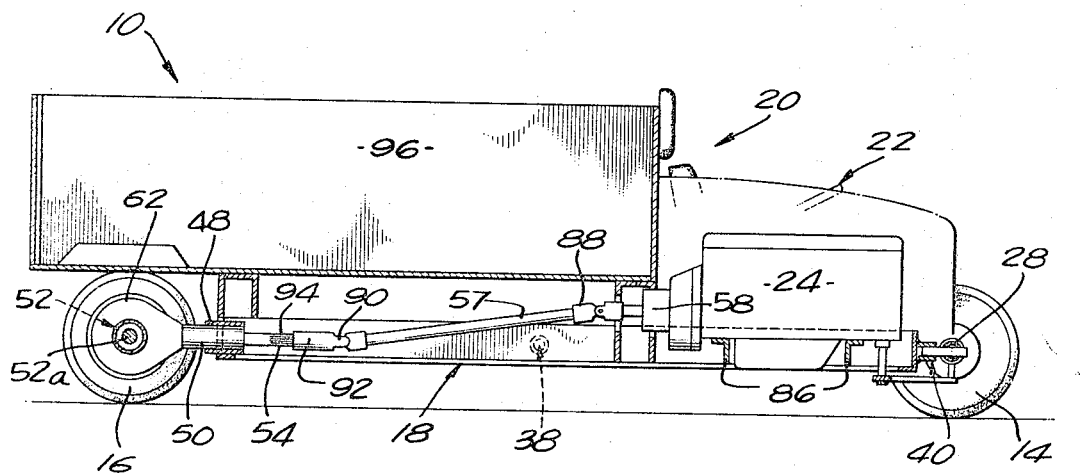
FIGURE 6 is a section taken on line 6—6 in FIGURE 5.
Figure 7:
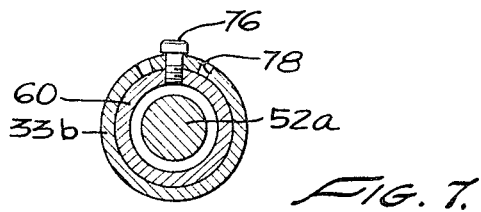
FIGURE 7 is an enlarged section taken on line 7—7 in FIGURE 5.

Vehicle chassis 18 comprises a rigidly, generally rectangular frame 80 having side and end channels 82 and 84. This rigid frame is somewhat smaller in its external dimensions than the articulated frame 12 and is disposed within the latter frame. The pivot bearing sleeves 44 and 48 of the pivot bearing means 38, 40, and 42 are welded or otherwise rigidly joined to the side and end channels, respectively, of the rigid frame. As shown best in FIGURE 5, the rear bearing sleeve 48 extends centrally through the rear frame channel 84. Referring to FIGURE 6, it will be observed that the propulsion motor 24 is supported on rigid cross members 86 of the frame 80. In the particular vehicle illustrated, the output shaft of the motor 24 is located a small distance above the drive shaft 54. Accordingly, the drive shaft extension 57 slopes downwardly at a small angle toward the rear end of the vehicle and is driveably coupled to the motor shaft and the drive shaft by universal couplings 88 and 90. The rear universal coupling 90 includes an integrally spined sleeve 92 which slideably receives a spined end 94 on the drive shaft 54. A vehicle according to the invention may have various body configurations. The particular vehicle illustrated, for example, has a front hood 96 which encloses the motor 24 and a rear, upwardly opening cargo space 96.

It is now obvious that the rear drive wheels 16 of the vehicle 10 are driven by the motor 24 through the drive shaft extension 57, the drive shaft 54, the differential gearing 56, and the rear axles 52a. The vehicle may be driven forwardly and in reverse by appropriate operation of the transmission 58. The front vehicle wheels 14 are turned by the steering wheel 22 for steering the vehicle. During movement of the vehicle over uneven terrain, the vehicle wheels 14, 16 rise and fall essentially independently of one another, as mentioned earlier, in accordance with the contour of the terrain encountered by each wheel. Vertical displacement of the vehicle wheels causes relatively pivotal movement of the vehicle chassis 18 and the side and end members 26, 28, and 30 of the articulated frame 12 on the transverse and longitudinal pivot axes 34, 36 in the manner mentioned earlier and more fully explained in the aformentioned Patent No. 3,266,815. During this relative pivotal movement of the chassis and frame members, the corners members 32, 33 of the articulated frame undergo rotation relative to their respective side and end frame members on the longitudinal axes of these members. It is obvious that relative pivotal movement of the frame 12 and chassis 18 requires, in addition to freedom of rotary movement at the several pivot joints of the vehicle, i.e., the pivotal connections between the corner members 32, 33 and the frame members 26, 28 and 30 and the pivotal connections 38, 40, 42 between the frame and chassis, freedom of axial movement at least at certain of these joints. For example, if the pivotal connections 38, 40, 42 between the frame 12 and the chassis 18 have no freedom of axial movement, the spacing, laterally of the vehicle, between the corresponding ends of the frame side members 26 and the spacing, lengthwise of the vehicle, between the corresponding ends of the frame end members 28, 30 will change during relative pivotal movement of the frame and chassis. In this case, the pivotal connections between the frame corner members 32, 33 and the frame side and end members 26, 28, 30 must have sufficient freedom of axial movement to accommodate the change in spacing between the frame side and end members. On the other hand, if the pivotal connections between the frame corner members and the frame side and end members have no freedom of axial movement, the spacing, laterally of the vehicle, between the corresponding ends of the frame side members 26 and the spacing, lengthwise of the vehicle, between the corresponding ends of the frame end members 28, 30 will remain constant. In this case, the frame members will move in and out toward and away from the chassis during relative pivotal movement of the frame and chassis, whereby the pivotal connections 38, 40, and 42 between the frame and chassis must have freedom of axial movement. In the particular vehicle illustrated, it is assumed that the latter pivotal connections have such freedom of axial movement. Accordingly, during relative pivotal movement of the frame 12 and chassis 18, the drive shaft 54 undergoes axial movement relative to the drive shaft extension 57. This relative axial movement of the drive shaft and shaft extension is permitted by the spined coupling 92, 94 between the drive shaft and the shaft extension.

It is significant to note that since the relative movement which occurs between the rear frame member, or axle housing, 30 and the chassis 18 during relative pivotal movement of the frame 12 and the chassis is purely rotational movement about the longitudinal pivot axis 36, and since the drive shaft 54 extends along this pivot axis, the drive shaft does not in any way inhibit relatively pivotal movement of the frame and chassis. Moreover this relative movement does not create any bending stresses in the drive shaft.

It is now obvious, therefore, that the invention herein described and illustrated is fully capable of attaining the several objects and advantages preliminarily set forth.

While the invention has herein been shown and described in what is conceived to be the most practical and preferred embodiment, it is recognized that departures may be made therefrom within the scope of the invention, which is not to be accorded the full scope of the claims so as to embrace any and all equivalent devices.

Having described the invention, what is claimed as new in support of Letters Patent is:

1. A self-propelled vehicle comprising:
   an open generally rectangular frame including side members and end members having their adjacent ends pivotally connected at the corners, respectively, of said frame in such manner as to adapt said frame for articulation involving simultaneous pivoting of said side members in opposite directions on a transverse pivot axis of said frame and simultaneous pivoting of said end members in opposite directions on a longitudinal pivot axis of said frame;
   a rigid chassis cooperatively associated with said frame;
   pivot means pivotally connecting said frame and chassis on said pivot axes, respectively;
   ground engaging wheels on said frame including a pair of drive wheels at opposite ends of one end member of said frame, said one end member extending substantially the full width of said frame to form an axle housing;
   a propulsion motor on said chassis;
   axle means extending through said one end member on the longitudinal axis thereof, being rotatably supported by said one end member and drivably coupled to said drive wheels;
   a rotary drive shaft extending between said one end member and said chassis on said longitudinal pivot axis, the associated pivot means including a rigid tubular journal extending from said one end member towards said chassis on said longitudinal pivot axis and a bearing sleeve rigid on said chassis and rotatably receiving said journal;
   means drivably coupling said motor to one end of said drive shaft;

said drive shaft extending centrally through said journal into the interior of said one end member;
and gear means within said axle housing drivably coupling the other end of said drive shaft to said axle means.

2. A vehicle as claimed in claim 1 wherein said frame includes four corner pieces, certain of said corner pieces and members having bearing openings and certain of said corner pieces and members having bearing portions rotatably received therein to engage said bearing openings, so that certain ends of said side and end members are rotatable relative to the respectively associated corner pieces.

3. A vehicle as claimed in claim 2 wherein said axle means also extend through the corner pieces associated with said one end member.

References Cited

UNITED STATES PATENTS

| | | | |
|---|---|---|---|
| 812,037 | 2/1906 | Hanson et al. | 280—104 |
| 1,439,802 | 12/1922 | Miranda | 280—104 |
| 2,323,817 | 7/1943 | Lee. | |
| 2,948,546 | 8/1960 | Fabere et al. | 280—111 X |
| 3,266,815 | 8/1966 | Bishop | 280—104 |

A. HARRY LEVY, *Primary Examiner.*